United States Patent Office 3,225,108
Patented Dec. 21, 1965

3,225,108
STABILIZED VINYL CHLORIDE MONOMER
Adah P. Sturgis, Baton Rouge, La., assignor to Ethyl Corporation, New York, N.Y., a corporation of Virginia
No Drawing. Filed Nov. 30, 1960, Ser. No. 72,556
3 Claims. (Cl. 260—652.5)

This invention relates to the art of stabilizing vinyl chloride, and particularly to vinyl chloride monomer compositions stabilized against pre-polymerization.

It is known that vinyl chloride monomer can be inhibited against polymerization by the addition thereto of certain compounds. In commercial practice it is generally the practice to inhibit the vinvyl chloride monomer immediately after initial preparation to prevent pre-polymerization, i.e. polymerization of the vinyl chloride before the intended time.

Pre-polymerization of this monomer presents an extremely troublesome and expensive problem for not only is the polymerized vinyl chloride completely wasted but in addition the pre-formed polymer must be removed from the monomer before the monomer can itself be subjected to the desired polymerization conditions. Obviously also, pre-polymerization presents acute problems when lines, valves, storage tanks, tank cars and other facilities are suddenly and quite unexpectedly fouled by polymer. One of the most distressing things which can happen is for plant lines and equipment to be "frozen" by polymer. In severe cases drilling and cutting tools must be employed to salvage the equipment. For these reasons then, generally an inhibitor is added to the vinyl chloride monomer immediately after preparation and prior to storage for eventual use.

But the addition of inhibitors to vinyl chloride monomer to prevent pre-polymerization also presents difficulties. Before subjecting the monomer to polymerization, the inhibitor must be removed from the monomer or its effect overcome to prevent interference with polymerization rate and polymeric properties. Generally, the inhibitor and vinyl chloride monomer are separated from each other by distillation. In the case of a phenolic inhibitor, which is a very useful and desirable pre-polymerization inhibitor, the inhibitor is removed by caustic washing to insure its complete removal. The caustic washing must then be followed by distillation to insure complete removal of the caustic.

To eliminate the quite burdensome inhibitor removal steps of commercial practice it is often attempted to avoid adding any inhibitor to the vinyl chloride. This technique is satisfactory if the monomer can be kept out of all contact with air or oxygen containing compounds for the monomer under these conditions will not polymerize. Unfortunately however, it is virtually impossible to maintain these conditions in commercial practice and always a certain percentage of the uninhibited monomer undergoes pre-polymerization during storage. Hence the art had to pay a price for avoiding the use of an inhibitor.

Several attempts have been made to overcome the foregoing problems by adding an inhibitor immediately after preparation of the monomer and then trying to overcome the inhibiting effects of the inhibitor with some additive just prior to polymerization. Thus, various and excess quantities of catalysts have been added to polymerization recipes to overcome the effect of the added inhibitor to thereby effect polymerization of the monomer at a reasonable polymerization rate and without removing the inhibitor. Unfortunately such attempts have met with considerable difficulties and usually failure inasmuch as adverse side effects degrade polymer properties.

Despite the foregoing and other adverse effects it is an object of the present invention to advance the state of the art and to provide inhibited vinyl chloride monomer compositions which are adequately stabilized in the presence of light and air and are yet capable of being successfully polymerized under desirable polymerizing conditions without removal of the inhibitor. Specifically, it is an object of this invention to provide specified and specific concentrations of phenolic-vinyl chloride inhibitor compositions which avoid pre-polymerization difficulties and which can be polymerized at the desired time without the necessity of having to remove the inhibitor from the monomeric vinyl chloride, said polymerization being accomplished without any substantial decrease in polymerization rate and without degradation of polymer properties. Yet another object is to provide phenolic-vinyl chloride compositions which can be formed into polyvinyl chloride having a gel count lower than polyvinyl chloride formed from vinyl chloride monomer containing no phenolic compounds, though polymerized under otherwise identical conditions. A further object is to provide a novel process whereby an infinitesimal amount of an additive is introduced into any known vinyl chloride polymerization recipe or system at any time prior to the occurrence of any substantial degree of polymerization so that the gel count of the polymer produced is lower than it would be in the absence of the additive.

Accordingly these and other objects are accomplished by the present invention which comprises forming stable vinyl chloride monomer compositions by adding to vinyl chloride monomer from about one-half to about thirty parts of a phenolic compound per million parts of vinyl chloride monomer. The compositions formed by the addition of these infinitesimal but critical amounts of phenolic compounds to the vinyl chloride monomer will not polymerize under ordinary storage conditions but nevertheless can be polymerized in ordinary polymerization processes under desirable polymerization conditions and without adverse effect upon the rate of polymerization or upon polymeric properties. In other words, the additive complement of the vinyl chloride monomer compositions of this invention, unlike all prior practice, need not be removed or otherwise compensated for during the intended polymerization reactions. Further, the use of the infinitesimal amounts of the phenolic compounds in the vinyl chloride monomer actually enhances the monomer by lowering the gel count of the polyvinyl chloride formed therefrom. This is indeed an extremely significant advantage and provides a unique process for the production of polyvinyl chloride having a lesser gel count than polymer produced in the same process in the absence of the phenolic inhibitor. Thus, in accordance with the present invention infinitesimal amounts of phenolic compounds are added to vinyl chloride preferably at a time to inhibit the vinyl chloride against pre-polymerization and also to provide a vinyl chloride composition which can be polymerized in normal polymerization recipes to provide low gel counts. In any event, however, benefits can be obtained pursuant to this invention if the phenolic compounds are added to the vinyl chloride or to the vinyl chloride polymerization recipe or system prior to any substantial polymerization of the vinyl chloride monomer.

As indicated above, the phenolic compound, when introduced into the vinyl chloride polymerization recipe or system, should be used in amount corresponding to from about 0.5 to about 30 parts per each million parts of vinyl chloride monomer present or in an amount which will distribute this amount of the phenolic compound in the monomer.

The potency of the infinitesimal amount of additive complement of this invention in inhibiting the vinyl chloride monomer against pre-polymerization is outstanding.

Thus in standard test procedures ordinary unihibited monomer will begin to polymerize at least before the end of 48 hours. In sharp contrast, at the end of 1200 hours, when the experiments were discontinued, none of the inhibited compositions of this invention showed any evidence whatever of any pre-polymerization. The samples remained perfectly clear. Further, when the inhibited monomer compositions were subjected to normal polymerization in accordance with various processes there were no adverse effects upon polymerization rate, polymeric properties or any ill-effects upon the polymerization processes. This discovery was indeed surprising, and all the more unusual inasmuch as vinylidene chloride, a somewhat related compound, did not respond to this treatment with phenols, and pre-polymerization under similar conditions was not prevented.

According to one embodiment of this invention from about one-half to about 30 parts of a phenolic compound is incorporated with each million parts of vinyl chloride monomer, prior to the inception of any substantial pre-polymerization thereof. In other words, to vinyl chloride monomer however manufactured—dehydrochlorination of 1,2-dichloroethane, hydrochlorination of acetlyene, etc.—is added, generally after the last distillation step, an infinitesimal amount of a phenolic compound. The resultant pre-polymerization inhibited composition can then be subjected to polymerization at any appropriate time thereafter by incorporation into a polymerization recipe which is subjected to polymerizing conditions.

By providing vinyl chloride monomer with from about one-half to about 30 parts of a phenolic compound, per million parts of vinyl chloride monomer, there is formed a composition highly resistant to pre-polymerization but yet not resistant to polymerization in ordinary suspension polymerization processes. In fact, such compositions are highly suitable for polymerization in all kinds of suspension polymerization systems. Preferred compositions are formed by the use of from about one-half to about 10 parts of a phenolic compound, based on a million parts of vinyl chloride monomer. Such compositions are preferred because not only is pre-polymerization very effectively prevented, but the so-inhibited vinyl chloride monomer compositions are generally suitable to all types of polymerization systems. As a matter of fact, in these compositions there is no necessity of changing the conditions of polymerization to any significant extent. Thus, even in a wide number of polymerization processes employing various recipes it is unnecessary to change these proportions to prevent even minor adverse effects upon polymerization rate or upon polymeric properties. In an especially preferred embodiment, from about one-half to about 2 parts of a phenolic compound, per million parts of vinyl chloride monomer, are added to vinyl chloride monomer to form the novel compositions of this invention. These compositions are adaptable to any and all types of polymerization systems without any modification of process conditions. Furthermore, despite the fact that in this embodiment the inhibitor concentrations are essentially microscopic, the resistance of the resultant compositions to pre-polymerization is tremendously great. In addition to the concentration variations of the phenolic compounds in vinyl chloride monomer, certain classes of phenolic compounds are also of a more preferred class inasmuch as some offer advantages over other types of phenolic compounds.

Typical phenols for use in this invention are those characterized by containing in the molecule from one to two aromatic rings, from one to four phenolic hydroxyl groups, and from six to about thirty-six carbon atoms. Broadly illustrative of such phenolic compounds are such mononuclear compounds as phenol, alkoxy phenols, for example p-methoxy phenol, etc., catechol, resorcinol, hydroquinone, 1,2,3,4-tetrahydroxybenzene, and alkyl substituted phenols such as p-tert-amyl phenol, 2,4,6-tri-tert-butyl phenol, 2,4,6-triheptyl phenol, and the like. Phenol containing two benzene rings includes non-fused ring compounds such as the biphenols and substituted biphenols, for example O,O'-bis-phenol, 2,2',3,3',5,5'-hexabutyl-4,4'-dihydroxy diphenyl including bridged structures such as di(3,5-dialkylhydroxyphenyl) methanes and the like. Fused ring compounds include 1,2,3,4-tetrahydroxynaphthalene, including alkyl substituted derivatives thereof, and the like. However, many other kinds of phenols can be employed.

A preferred embodiment of this invention are those vinyl chloride compositions containing a phenolic compound characterized by containing in the molecule from one to two aromatic rings from one to two hydroxyl groups, and from six to about thirty-six carbon atoms. These compounds are characterized by being readily available at low cost and are utilizable to provide results on a very low cost-effectiveness basis. Illustrative of such phenolic compounds are for example, phenol; the cresols; the xylenols, phenolic ethers, for example m-ethoxy phenol, or other such compounds as 2-naphthol, trialkyl phenols, p,p'-biphenol, alkylated naphthols such as 4-isopropyl-1-naphthol and the like. A highly preferred embodiment are those vinyl chloride compositions comprising vinyl chloride monomer inhibited with mononuclear phenolic compounds characterized by containing from one to two phenolic hydroxyl groups and from 6 to about 24 carbon atoms. Illustrative of such compounds are phenol, p-methoxy phenol, catechol, resorcinol, hydroquinone, pyrogallol, and alkyl substituted compounds of these types, for example, 2,4,6-tri-tert-butyl phenol, 3,5-di-tert-amyl-catechol, 2,4,6-tri-hexyl phenol and the like. Such phenols are particularly excellent inhibitors for forming inhibited vinyl chloride monomer compositions, and are outstanding from a cost-effectiveness standpoint since they are available at very low cost as staple articles of commerce. Liquid, monohydric mononuclear phenols having from 6 to about 18 carbon atoms in the molecule are the most outstanding inhibitors for this invention because of their tremendous effectiveness at minute concentration and their excellent solubility characteristics in the monomer.

The following examples illustrate the ability of novel compositions of this invention to withstand pre-polymerization under normal storage and plant operating conditions. In all examples parts and percentages are by weight.

The test procedure used to demonstrate the outstanding resistance of the composition of this invention to pre-polymerizaion involves preparing oxygen-free vinyl chloride monomer by placing freshly distilled monomer within separate glass vessels. The separate vessels are, sequentially, cooled to −78° C., evacuated to remove air, the contents warmed to the boiling point, the vessels cooled and again evacuated, and this procedure repeated through three cycles. Those vinyl chloride portions to be inhibited with phenolic compounds are inhibited just prior to the beginning of the third cycle by the addition thereto of a calculated amount of the particular phenol. When the temperature of the vinyl chloride monomer is reduced to −78° C. at the beginning of the third cycle, air at a pressure of 650 millimeters is introduced into each of the vessels. Therefore, when equilibrium is reached, each of the vessels contains 3.2 mole percent oxygen in the vapor phase. The vessels are then sealed and maintained at 50° C. while continuously agitating the contents. Periodic observations of the samples are made to determine the advent, if any, of pre-polymerization. It was found, as will be shown in the examples below, that the uninhibited monomer in all instances began undesirable pre-polymerization in less than 48 hours. Generally however, even at the end of 50 days, when the experiments were terminated, various inhibited monomer compositions of this invention remained clear and colorless, showing no signs whatever of any pre-polymerization. This conclusively shows that the vinyl chloride monomer inhibited in accordance with the pres-

EXAMPLE I

Identical glass vessels are filled to the same level, one with uninhibited vinyl chloride monomer and the other with vinyl chloride inhibited with one part of phenol, per million parts of vinyl chloride monomer, as described above. The contents of both vessels are subjected to identical polymerization conditions as described above. Polymerization of the uninhibited monomer can be clearly observed at the end of 30 hours and the monomer turns completely milky at the end of 36 hours. However, there is not the faintest evidence of any impending polymerization of the inhibited monomer even at the end of 1200 hours.

EXAMPLE II

The procedure of Example I is repeated except that one of the vessels contains vinyl chloride monomer inhibited with 10 parts per million of phenol and the other vessel contains uninhibited monomer. At the end of 40 hours the uninhibited monomer begins to polymerize and at the end of 46 hours the composition is completely opaque. The inhibited monomer shows no signs of polymerization even at the end of a very long period of time when the determinations are stopped.

EXAMPLE III

Identical charges of vinyl chloride monomer, other than the fact that one is uninhibited and the other is inhibited with 30 parts, per million parts of monomer, of phenol, are subjected to the conditions defined above. At the end of 41 hours the uninhibited monomer begins to get "milky" in appearance. The (3) hours later the monomer is completely opaque. The inhibited monomer shows no sign whatever of polymerization even at the end of 1200 hours when the run is terminated.

EXAMPLE IV

Into two glass vessels is charged vinyl chloride monomer containing 3.2 mole percent oxygen in the vapor phase. The contents of one of the vessels is inhibited with p-cresol at a concentration of 1 part, per million parts of vinyl chloride monomer. Upon subjecting these charges of monomer to identical conditions as heretofore described, it is found that the uninhibited monomer begins to polymerize in about 38 hours. Polymerization rapidly progresses until at the end of 42 hours the monomer is cloudy or milky in appearance. The inhibited monomer shows no change in appearance whatever, even at the end of an extremely long period of time.

EXAMPLE V

Identical charges of vinyl chloride monomer, other than for the fact that one is uninhibited and the other is inhibited with 2 parts, per million parts of monomer, of p-amino phenol, are subjected to the conditions defined above. At the end of 40 hours the uninhibited monomer begins to get "milky" in appearance. Six (6) hours later the monomer is completely opaque. The inhibited monomer shows no sign whatever of polymerization even at the end of an extremely long period of time when the run is terminated.

EXAMPLE VI

The procedure of Example I is repeated except that one of the vessels contains vinyl chloride monomer inhibited with 0.5 part per million of 3-hydroxypyridine and the other vessel contains uninhibited monomer. At the end of 39 hours the uninhibited monomer begins to polymerize and at the end of 41 hours is completely opaque. The inhibited monomer shows no signs of polymerization even at the end of a very long period of time when the determinations are stopped.

EXAMPLE VII

Into two glass vessels is charged vinyl chloride monomer containing 3.2 mole percent oxygen in the vapor phase. The contents of one of the vessels is inhibited with 2,4,6-tri-tert-butyl phenol at a concentration of 1 part, per million parts of vinyl chloride monomer. Upon subjecting these charges of monomer to identical conditions as heretofore described, it is found that the uninhibited monomer begins to polymerize in about 40 hours. Polymerization rapidly progresses until at the end of 41 hours the monomer is cloudy or milky in appearance. The inhibited monomer shows no change in appearance whatever, even at the end of an extremely long period of time.

EXAMPLE VIII

Example I is again repeated in all details except that one of the vessels is charged with inhibited monomer containing 2 parts, per million parts of vinyl chloride, of pentamethyl phenol. Though the inhibited monomer shows no signs of polymerization even at the end of a very significant period of time, the uninhibited monomer begins to polymerize at the end of 40 hours, and is completely opaque 44 hours later.

EXAMPLE IX

The procedure of Example I is repeated except that one of the vessels contains vinyl chloride monomer inhibited with 1 part per million of 2,4-di-(1,1,3,3-tetramethylbutyl)phenol and the other vessel contains uninhibited monomer. At the end of 42 hours the uninhibited monomer begins to polymerize and at the end of 48 hours is completely opaque. The inhibited monomer shows no signs of polymerization, even at the end of a very long period of time when the determinations are stopped.

EXAMPLE X

Example I is again repeated in all details except that one of the vessels is charged with inhibited monomer containing 5 parts, per million parts of vinyl chloride, of 2,6,di-(2-hexyl)-4-(2-octadecyl)phenol. Though the inhibited monomer shows no signs of polymerization even at the end of a very significant period of time, the uninhibited monomer begins to polymerize at the end of 42 hours, and is completely opaque 48 hours later.

EXAMPLE XI

Identical charges of vinyl chloride monomer, other than for the fact that one is uninhibited and the other is inhibited with 1 part, per million parts of monomer, of p-methoxy phenol, are subjected to the conditions defined above. At the end of 37 hours the uninhibited monomer begins to get "milky" in appearance. Three (3) hours later the monomer is completely opaque. The inhibited monomer shows no sign whatever of polymerization even at the end of an extremely long period of time when the run is terminated.

EXAMPLE XII

Into two glass vessels is charged vinyl chloride monomer containing 3.2 mole percent oxygen in the vapor phase. The contents of one of the vessels is inhibited with m-butoxy phenol at a concentration of 0.5 part, per million parts of vinyl chloride monomer. Upon subjecting these charges of monomer to identical conditions as heretofore described, it is found that the uninhibited monomer begins to polymerize in about 43 hours. Polymerization rapidly progresses until at the end of 45 hours the monomer is cloudy or milky in appearance. The inhibited monomer shows no change in appearance whatever, even at the end of an extremely long period of time.

EXAMPLE XIII

The procedure of Example I is repeated except that one of the vessels contains vinyl chloride monomer inhibited with 2 parts per million parts of resorcinol and the other vessel contains uninhibited monomer. At the end of 30 hours the uninhibited monomer begins to polymerize and at the end of 35 hours is completely opaque. The inhibited monomer shows no signs of polymerization, even at the end of a very long period of time when the determinations are stopped.

EXAMPLE XIV

Identical charges of vinyl chloride monomer, other than for the fact that one is uninhibited and the other is inhibited with 1 part, per million parts of monomer, of hydroquinone, are subjected to the conditions defined above. At the end of 26 hours the uninhibited monomer begins to get "milky" in appearance. Four (4) hours later the monomer is completely opaque. The inhibited monomer shows no sign whatever of polymerization even at the end of an extremely long period of time when the run is terminated.

EXAMPLE XV

Example I is again repeated in all details except that one of the vessels is charged with inhibited monomer containing 3 parts, per million parts of vinyl chloride, of pyrogallol. Though the inhibited monomer shows no signs of polymerization even at the end of a very significant period of time, the uninhibited monomer begins to polymerize at the end of 22 hours, and is completely opaque 4 hours later.

EXAMPLE XVI

Into two glass vessels is charged vinyl chloride monomer containing 3.2 mole percent oxygen in the vapor phase. The contents of one of the vessels is inhibited with 2,3,5,6-tetrahydroxy benzene at a concentration of 5 parts, per million parts of vinyl chloride monomer. Upon subjecting these charges of monomer to identical conditions as heretofore described, it is found that the uninhibited monomer begins to polymerize in about 18 hours. Polymerization rapidly progresses until at the end of 22 hours the monomer is cloudy or milky in appearance. The inhibited monomer shows no change in appearance whatever, even at the end of an extremly long period of time.

EXAMPLE XVII

Example I is again repeated in all details except that one of the vessels is charged with inhibited monomer containing 1 part, per million parts of vinyl chloride, of 3,5-di-tert-butyl catechol. Though the inhibited monomer shows no signs of polymerization even at the end of a very significant period of time, the uninhibited monomer begins to polymerize at the end of 24 hours and is completely opaque 28 hours later.

EXAMPLE XVIII

The procedure of Example I is repeated except that one of the vessels contains 2 parts, per million parts of vinyl chloride monomer, of 2,5-di-tert-amyl hydroquinone and the other vessel contains uninhibited monomer. At the end of 31 hours the uninhibited monomer begins to polymerize and at the end of 33 hours is completely opaque. The inhibited monomer shows no signs of polymerization even at the end of a very long period of time when the determinations are stopped.

EXAMPLE XIX

Identical charges of vinyl chloride monomer, other than for the fact that one is uninhibited and the other is inhibited with 5 parts, per million parts of vinyl chloride monomer, of 5-tert-butyl pyrogallol, are subjected to the conditions defined above. At the end of 21 hours the uninhibited monomer begins to get "milky" in appearance. Twenty-three (23) hours later the monomer is completely opaque. The inhibited monomer shows no sign whatever of polymerization even at the end of an extremely long period of time when the run is terminated.

EXAMPLE XX

Into two glass vessels is charged vinyl chloride monomer containing 3.2 mole percent oxygen in the vapor phase. The contents of one of the vessels is inhibited with 2,6-dimethoxyphenol at a concentration of 10 parts, per million parts of vinyl chloride monomer. Upon subjecting these charges of monomer to identical conditions as heretofore described, it is found that the uninhibited monomer begins to polymerize in about 33 hours. Polymerization rapidly progresses until at the end of 36 hours the monomer is cloudy or milky in appearance. The inhibited monomer shows no change in appearance whatever, even at the end of an extremely long period of time.

EXAMPLE XXI

Identical charges of vinyl chloride monomer, other than for the fact that one is uninhibited and the other is inhibited with 1 part, per million parts of vinyl chloride monomer, of 4-hydroxy diphenyl, are subjected to the conditions defined above. At the end of 40 hours the uninhibited monomer begins to get "milky" in appearance. Forty-three (43) hours later the monomer is completely opaque. The inhibited monomer shows no sign whatever of polymerization even at the end of an extremely long period of time when the run is terminated.

EXAMPLE XXII

Example I is again repeated in all details except that one of the vessels is charged with inhibited monomer containing 0.5 part, per million parts of vinyl chloride, of 2-sec-butyl-4-phenylphenol. Though the inhibited monomer shows no signs of polymerization even at the end of a very long period of time, the uninhibited monomer begins to polymerize at the end of 41 hours, and is completely opaque 45 hours later.

EXAMPLE XXIII

Into two glass vessels is charged vinyl chloride monomer containing 3.2 mole percent oxygen in the vapor phase. The contents of one of the vessels is inhibited with 3,3′5,5′-tetra-tert-butyl-4,4′-dihydroxydiphenyl at a concentration of 1 part, per million parts of monomer. Upon subjecting these charges of monomer to identical conditions as heretofore described, it is found that the uninhibited monomer begins to polymerize in about 38 hours. Polymerization rapidly progresses until at the end of 40 hours the monomer is cloudy or milky in appearance. The inhibited monomer shows no change in appearance whatever, even at the end of an extremely long period of time.

EXAMPLE XXIV

The procedure of Example I is repeated except that one of the vessels contains 10 parts, per million parts of vinyl chloride monomer, of 4,4′-di-(1,1,2-trimethylpropyl)-6,6′-dimethyl-2,2′-dihydroxydiphenyl and the other vessel contains uninhibited monomer. At the end of 37 hours the uninhibited monomer begins to polymerize and at the end of 39 hours is completely opaque. The inhibited monomer shows no signs of polymerization even at the end of a very long period of time when the determinations are stopped.

EXAMPLE XXV

Example I is again repeated in all details except that one of the vessels is charged with inhibited monomer containing 3 parts, per million parts of vinyl chloride, of 4,4′-dihydroxydiphenylmethane. Though the inhibited monomer shows no signs of polymerization even at the end of a very long period of time, the uninhibited monomer begins to polymerize at the end of 39 hours, and is completely opaque 43 hours later,

EXAMPLE XXVI

Into two glass vessels is charged vinyl chloride monomer containing 3.2 mole percent oxygen in the vapor phase. The contents of one of the vessels is inhibited with 4-hydroxydiphenyl sulfide at a concentration of 5 parts, per million parts of vinyl chloride monomer. Upon subjecting these charges of monomer to identical conditions as heretofore described, it is found that the uninhibited monomer begins to polymerize in about 35 hours. Polymerization rapidly progresses until at the end of 40 hours the monomer is cloudy or milky in appearance. The inhibited monomer shows no change in appearance whatever, even at the end of an extremely long period of time.

EXAMPLE XXVII

Identical charges of vinyl chloride monomer, other than for the fact that one is uninhibited and the other is inhibited with 5 parts, per million parts of vinyl chloride monomer, of 4-hydroxydiphenylamine, are subjected to the conditions defined above. At the end of 32 hours the uninhibited monomer begins to get "milky" in appearance. Thirty-eight (38) hours later the monomer is completely opaque. The inhibited monomer shows no sign whatever of polymerization even at the end of an extremely long period of time when the run is terminated.

EXAMPLE XXVIII

The procedure of Example I is repeated except that one of the vessels contains vinyl chloride inhibited with 1 part per million parts of β-naphthol and the other vessel contains uninhibited monomer. At the end of 40 hours the uninhibited monomer begins to polymerize and at the end of 48 hours is completely opaque. The inhibited monomer shows no signs of polymerization, even at the end of a very long period of time when the determinations are stopped.

EXAMPLE XXIX

Example I is again repeated in all details except that one of the vessels is charged with inhibited monomer containing 10 parts, per million parts of vinyl chloride, of α-naphthol. Though the inhibited monomer shows no signs of polymerization even at the end of a very significant period of time, the uninhibited monomer begins to polymerize at the end of 35 hours, and is completely opaque 40 hours later.

EXAMPLE XXX

The procedure of Example I is repeated except that one of the vessels contains vinyl chloride monomer stabilized with 30 parts per million parts of 2,4,5,7-tetra-tert-butyl-α-naphthol and the other vessel contains uninhibited monomer. At the end of 40 hours the uninhibited monomer begins to polymerize and at the end of 43 hours is completely opaque. The inhibited monomer shows no signs of polymerization, even at the end of a very long period of time when the determinations are stopped.

EXAMPLE XXXI

Identical charges of vinyl chloride monomer, other than for the fact that one is uninhibited and the other is inhibited with 0.5 part per million parts of vinyl chloride monomer, of 1,5-dihydroxynaphthalene are subjected to the conditions defined above. At the end of 27 hours the uninhibited monomer begins to get "milky" in appearance. Thirty-one hours later the monomer is completely opaque. The inhibited monomer shows no signs whatever of polymerization even at the end of an extremely long period of time when the run is terminated.

EXAMPLE XXXII

Into two glass vessels is charged vinyl chloride monomer containing 3.2 mole percent oxygen in the vapor phase. The contents of one of the vessels is inhibited with 6,6'-methylene-bis(4-methylresorcinol) at a concentration of 1 part per million parts of vinyl chloride monomer. Upon subjecting these charges of monomer to identical conditions as heretofore described, it is found that the uninhibited monomer begins to polymerize in about 34 hours. Polymerization rapidly progresses until at the end of 40 hours the monomer is cloudy or milky in appearance. The inhibited monomer shows no change in appearance whatever, even at the end of an extremely long period of time.

EXAMPLE XXXIII

Identical charges of vinyl chloride monomer, other than for the fact that one is uninhibited and the other is inhibited with 2 parts per million parts of vinyl chloride monomer, of 1,2,7,8-tetrahydroxynaphthalene, are subjected to the conditions defined above. At the end of 40 hours the uninhibited monomer begins to get "milky" in appearance. Forty-eight hours later the monomer is completely opaque. The inhibited monomer shows no sign whatever of polymerization even at the end of an extremely long period of time when the run is terminated.

EXAMPLE XXXIV

Into two glass vessels is charged vinyl chloride monomer containing 3.2 mole percent oxygen in the vapor phase. The contents of one of the vessels is inhibited with 2,3,6,7-tetra-hexyl-1,4,5,8-tetrahydroxynaphthalene at a concentration of 5 parts, per million parts of vinyl chloride monomer. subjecting these charges of monomer to identical conditions as heretofore described, it is found that the uninhibited monomer begins to polymerize in about 35 hours. Polymerization rapidly progresses until at the end of 40 hours the monomer is cloudy or milky in appearance. The inhibited monomer shows no change in appearance whatever, even at the end of an extremely long period of time.

EXAMPLE XXXV

The procedure of Example I is repeated except that one of the vessels contains vinyl chloride monomer stabilized with 1 part per million of 3,3'-dibutyl-4,4'-dihydroxydiphenyl and the other vessel contains uninhibited monomer. At the end of 35 hours the uninhibited monomer begins to polymerize and at the end of 46 hours is completely opaque. The inhibited monomer shows no signs of polymerization, even at the end of a very long period of time when the determinations are stopped.

EXAMPLE XXXVI

Example I is again repeated in all details except that one of the vessels is charged with inhibited monomer containing 2 parts per million parts of vinyl chloride, of 4,4'-dihydroxydiphenyl. Though the inhibited monomer shows no sign of polymerization even at the end of an extremely long period of time, the uninhibited monomer begins to polymerize at the end of 46 hours, and is completely opaque 48 hours later.

EXAMPLE XXXVII

Identical charges of vinyl chloride monomer, other than for the fact that one is uninhibited and the other is inhibited with 30 parts per million parts of vinyl chloride monomer of 1,4-bis(3-hydroxy-5-amylphenyl)-butane are subjected to the conditions defined above. At the end of 35 hours the uninhibited monomer begins to get "milky" in appearance. Five hours later the monomer is completely opaque. The inhibited monomer shows no sign whatever of polymerization even at the end of an extremely long period of time when the run is terminated.

EXAMPLE XXXVIII

Example I is again repeated in all details except that one of the vessels is charged with inhibited monomer containing 10 parts per million parts of vinyl chloride, of 1,6 - bis(3,5 - di-tert-butyl - 4-hydroxyphenyl)hexane. Though the inhibited monomer shows no signs of polymerization even at the end of an extremely long period of time, the uninhibited monomer begins to polymerize at the end of 30 hours, and is completely opaque 40 hours later.

EXAMPLE XXXIX

The procedure of Example I is repeated except that one of the vessels contain vinyl chloride monomer inhibited with 1 part per million of 3,3'-dibutyl-4,4'-dihydroxydiphenylamine, and the other vessel contains uninhibited monomer. At the end of 32 hours the uninhibited monomer begins to polymerize and at the end of 39 hours is completely opaque. The inhibited monomer shows no signs of polymerization, even at the end of a very long period of time when the determinations are stopped.

EXAMPLE XL

Into two glass vessels is charged vinyl chloride monomer containing 3.2 mole percent oxygen in the vapor phase. The contents of one of the vessels is inhibited with 4,4'-dihydroxydiphenyl sulfide at a concentration of 20 parts per million parts of vinyl chloride monomer. Upon subjecting these charges of monomer to identical conditions as heretofore described, it is found that the uninhibited monomer begins to polymerize in about 35 hours. Polymerization rapidly progresses until at the end of 40 hours the monomer is cloudy or milky in appearance. The inhibited monomer shows no change in appearance whatever, even at the end of an extremely long period of time.

The following examples are illustrations of the use of the foregoing inhibited monomeric compositions for polymerization purposes, without any pretreatment to remove the phenolic inhibitor.

Examples XLI through XLVI deal specifically with suspension polymerization systems.

EXAMPLE XLI

To a reaction vessel equipped with a thermostat device for measuring temperature, a device for temperature control, reflux condenser, instruments and an agitating device is charged 200 parts of water, 0.3 part lauroyl peroxide and 0.3 part methyl cellulose. 100 parts of freshly distilled vinyl chloride monomer containing one part of phenol, per million parts of vinyl chloride monomer is then charged to a reaction vessel and the vessel sealed. The system is flushed with nitrogen, heated to 50° C. and agitated for a period of 12 hours.

At the end of this time the readily settable polymer, characteristic of such suspension type polymerization systems, is separated from the reaction charge by filtration. The polymer is then dried in a circulating oven for 12 hours at 50° C. The percent conversion of the vinyl chloride monomer to polymer is determined, and is found to be about 92 percent.

Where uninhibited vinyl chloride monomer is subjected to the identical polymerization conditions described in Example XLI the percent conversion of the vinyl chloride monomer to polymer at the end of a corresponding period of time is found to be 92 percent.

Comparison of the results of this demonstration with that of Example XLI thus conclusively shows that the rate of polymerization of the vinyl chloride monomer in a suspension type recipe is unaffected by the small amount of phenolic inhibitor present in the polymerization charge. In addition it is found that the relative viscosity of the polymer of this demonstration in a one percent solution of polymer in cyclohexanone is the same as that of a similar solution containing the polymer produced in Example XLI. This also conclusively shows that the phenolic inhibitor does not alter the normal molecular weight of the polymer produced. Other polymeric properties are unaltered but a significant improvement in the gel count of the polymer formed from the inhibited vinyl chloride monomer is found, as contrasted with the polymer formed from the uninhibited monomer.

EXAMPLE XLII

When the procedure of Example XLI is repeated except that the polymerization is carried out at 60° C. and a polymerization charge consisting of 200 parts water, 0.3 part of lauroyl peroxide, 0.3 part methyl cellulose and 100 parts of vinyl chloride monomer inhibited with 5 parts 1,3,5-trihydroxybenzene per million parts vinyl chloride, polymerization rate and molecular weight are again unaffected as contrasted with a process employing the same recipe under identical conditions except that uninhibited monomer is used. Again an improvement in gel count is found in the polymer resultant from the inhibited monomer as contrasted with the polymer resultant from the uninhibited monomer.

EXAMPLE XLIII

To the suspension recipe of Example XLI is added vinyl chloride monomer, inhibited with 3 parts, per million parts of vinyl chloride monomer, of 4,4'-dihydroxydiphenylmethane and the charge subjected to the conditions defined in that example. At the end of 12 hours the polymer was discharged from the apparatus and dried. Polymerization rate and molecular weight are normal in all respects, as if no inhibitor had been used. Gel count is again improved, as compared with the gel count of polymer obtained from uninhibited monomer employed in a similar process.

EXAMPLE XLIV

The procedure of Example XLI is repeated except that to the suspension polymerization recipe is added 10 parts, per million parts of vinyl chloride monomer, of 2-naphthol. At the end of 12 hours the polymer is removed from the apparatus and dried. The percent conversion of monomer to polymer is 92 percent, showing that the rate of polymerization is completely unaffected. Further, relative viscosity tests show no ill effects regarding molecular weight of the polymer. Tests show that the molecular weight is as normal as when no inhibitor is present, though gel count is again lower in the polymer from the inhibited monomer as contrasted with polymer from uninhibited monomer polymerized in a similar process.

EXAMPLE XLV

Example XLI is again repeated in all details except that the inhibited monomer portion of the recipe contains 30 parts, per million parts of vinyl chloride, of 4,4'-dihydroxydiphenyl sulfide. The polymer resulting from processing according to the conditions of Example XLI is completely normal with regard to molecular weight and the polymerization rate of the process is unaffected. Again the gel count shows a considerable improvement as compared with polymer resultant from uninhibited monomer from a similar process.

EXAMPLE XLVI

Each of the inhibited monomer compositions, pursuant to Examples I through XL are also polymerized in a suspension polymerization system and a duplicate polymerization is conducted with each under identical conditions except that uninhibited vinyl chloride monomer is employed. Polymerization rate and molecular weight of the product is substantially identical in all of the runs. Gel count again shows an improvement in the polymer resultant from the inhibited monomer as compared with the polymer formed from uninhibited monomer.

Other properties of the polymer prepared from the inhibited vis-a-vis the uninhibited monomer is also compared. The cake moisture or water retention in samples from each of the processes is identical as is the process ability of each of the polymeric samples. No trouble whatever is found with regard to foaming and samples of the two types of polymer are easily dewatered by centrifuging. Particle size, K-value, bulk-density and plasticizer are identical in the samples of polymer from the two processes. The important property of heat stability does not differ between the two samples. It is thus shown conclusively that great benefits can be obtained by the use of a minor amount of a phenolic inhibitor inasmuch as the advantages of inhibiting the monomer can be obtained and without adverse effects upon polymerization processes or upon polymer properties.

By way of numerical illustration the following absolute values were obtained regarding process and polymer properties when polymerizing, for example, the composition of Example I, i.e., 1 part of phenol per million parts of vinyl chloride monomer, in a suspension polymerization process and on the other hand an identical process except one wherein uninhibited monomer was used. Values for the duplicate run employing uninhibited monomer is listed under "uninhibited" and the example pursuant to this invention under "inhibited." All values are within the realm of experimental error and show the listed properties to be substantially identical.

Table I
THE PRESENT PHENOLIC INHIBITORS DO NOT HARM ANY POLYVINYL CHLORIDE PROCESS OR POLYMER PROPERTIES

| Property | Uninhibited | Inhibited |
| --- | --- | --- |
| Reaction time (hours) | 10.23 | 9.75 |
| Cake moisture (percent) | 23 | 23 |
| Processability | Excellent | Excellent |
| Yield (percent) | 92.5 | 92.5 |
| Particle size | Both substantially identical | |
| K-value | 68.1 | 68.0 |
| Bulk density (g./cc.) | 0.477 | 0.475 |
| Particle absorption | Identical | |
| Heat stability | Identical | |

With regard to the very significant polymeric property of gel count, the following experimental data is illustrative of the benefits obtained pursuant to the practice of this invention.

Uninhibited vinyl chloride monomer was added to a typical suspension polymerization recipe. Next, several compositions of vinyl chloride were formed which contained various phenolic compounds at concentrations of 1 part per million parts of vinyl chloride monomer. These compositions were then formed into polymerization recipes identical to the recipes containing the uninhibited monomer. Thus, these uninhibited and inhibited vinyl chloride monomer portions were blended with water, emulsifying materials, and peroxide polymerization catalysts to form suspension type polymerization systems. Polymerization was conducted under identical conditions and the polyvinyl chloride which was separated from the processes was dried and blended with a plasticizer and stabilizer, and milled on hot rollers. Ten-gram test portions were removed from various locations of the milled sheets to obtain an average gel count. Table II shows the gel count per 10 grams of the specimens after milling for various periods of time.

Table II
BENEFICIAL EFFECT OF PHENOLIC INHIBITORS ON POLYVINYL CHLORIDE GEL COUNT

| Run | Inhibitor | Concentration (p.p.m.) | Gel Count per 10 Grams After Milling For— | | |
| --- | --- | --- | --- | --- | --- |
| | | | 8 Min. | 10 Min. | 14 Min. |
| 1 | None (control) | 0 | 1,200 | 580 | 36 |
| 2 | p-Methoxy phenol | 1 | 24 | 0 | 0 |
| 3 | Phenol | 1 | 6 | 0 | 0 |
| 4 | β-Naphthol | 1 | 0 | 0 | 0 |

It is thus clearly shown by the above experimental data that the inhibited vinyl chloride in all cases provided a drastically reduced gel count, in fact, in almost all cases the gel count was nil.

The following examples demonstrate typical emulsion systems employing inhibited monomer pursuant to the present invention.

EXAMPLE XLVII 100 parts of water to which had been added 0.1 part potassium persulfate and 0.40 part of sodium laurate is charged into a reaction vessel equipped with a mercury and glass thermometer reflux condenser, a water jacket for controlling the temperature and a propeller type agitating device. Next, 100 parts of freshly distilled vinyl chloride monomer containing 1 part of p-methoxyphenol, per million parts of vinyl chloride monomer, is fed into the reactor. The reactor is then closed and agitated at 45° C. for 10 hours. At the end of this period the temperature of the reaction mass is reduced to 0° C. to freeze out the latex. The temperature is then brought to room temperature, about 25° C. and the polymer isolated from the reaction mass by filtration. The polymer is then dried in a circulating oven for 12 hours at 50° C. A determination of the percent conversion of vinyl chloride monomer to polymer showed that the rate of polymerization was unchanged over that which would be expected of a freshly distilled uninhibited vinyl chloride monomer. In addition, the molecular weight of the polymer, as determined by the relative viscosity method mentioned in Example XLI is essentially the same as when the polymer is produced from freshly distilled uninhibited monomer. Upon milling the gel count of the polymer produced from the inhibited monomer shows an improvement over the polymer produced from uninhibited monomer in an otherwise identical process.

EXAMPLE XLVIII

Example XLVII is again repeated in all details except that the inhibited monomer portion of the recipe contains 3 parts, per million parts of vinyl chloride, of pyrogallol. The polymer resulting from processing according to the conditions of Example XLVII is completely normal with regard to molecular weight. The polymerization rate is unaffected. Gel count is again improved in the milled polymer formed from the inhibited monomer.

EXAMPLE XLIX

The procedure of Example XLVII is repeated except that to the emulsion polymerization recipe is added 5 parts, per million parts of vinyl chloride monomer, of 4-hydroxydiphenylamine. At the end of 10 hours the polymer is removed from the apparatus and dried. The percent conversion of monomer to polymer is 95 percent, showing that the rate of polymerization is completely unaffected. Further, relative viscosity tests show no ill effects regarding molecular weight of the polymer. The molecular weight of the polymer is normal, i.e., the same as when no inhibitor is present in the monomer. Upon pressing, the gel count is improved, as compared with polymer produced in a similar process from uninhibited monomer.

EXAMPLE L

To the emulsion recipe of Example XLVII is added vinyl chloride monomer, inhibited with 2 parts, per million parts of vinyl chloride monomer, of 1,2,7,8-tetrahydroxynaphthalene and the charge subjected to the conditions defined in Example XLVII. At the end of 10 hours the polymer is discharged from the apparatus and dried. Polymerization rate and molecular weight are normal in all respects, as if no inhibitor had been used in the monomer. The gel count of the rolled polymer shows an improvement over rolled polymer produced from uninhibited monomer in a similar process.

EXAMPLE LI

When the procedure of Example XLVII is repeated except that the polymerization is carried out at 40° C., the polymerization charge consists of 120 parts water, 0.15 part of ammonium persulfate, 0.3 part sodium stearate and 100 parts of vinyl chloride monomer inhibited with 1 part 3,3'-dibutyl-4,4'-dihydroxydiphenyl, per million parts vinyl chloride, polymer rate and molecular weight are again unaffected as contrasted with a process employing the same recipe under identical conditions except that uninhibited monomer is used. The gel count of the milled polymer is again improved, as contrasted with milled polymer formed from uninhibited monomer in a similar process.

In this example, and in Examples XLVII through Example L, it is also found that other polymeric properties are essentially unaffected. Such important polymer properties as cake moisture, processability, particle size, K-value, bulk density, particle absorption, and heat stability are substantially identical to polymer obtained from similar processes employing uninhibited monomer.

A feature of this invention is that the phenolic additives, in the amount specified, can be added to any and all types of polymerization systems. Such systems can be bulk, solution, suspension, or emulsion. The composition of the recipes employed in these systems can be of a very wide variety and the processes can vary over a wide range of reaction conditions. Polymer produced by the incorporation of these additives as specified into the monomer thus produces polymer which when milled has a gel count far superior to a polymer produced from an otherwise identical process but wherein no additive is contained within the monomer. The recipes and process conditions which can be employed pursuant to this invention are for example as illustrated in U.S. 2,528,469, U.S. 2,537,334, U.S. 2,475,016, U.S. 2,694,700, U.S. 2,663,701 and U.S. 2,395,344.

As stated the phenolic inhibitors used in the formation of the various inhibited monomeric vinyl chloride compositions of this invention include at least four types:

The most preferred pre-polymerization inhibitors for vinyl chloride are mononuclear monohydric phenolic compounds characterized by containing from 6 to about 18 carbon atoms. Illustrative of these phenolic compounds are such halogen substituted phenols as m-bromophenol, p-bromophenol, p-chlorophenol, o-chlorophenol, 3,5-dichlorophenol, 3-chloro-5-bromophenol, and the like; such nitrogen containing phenols as p-aminophenol, o-aminophenol, 3,5-diaminophenol, 2,4,6-triaminophenol, 3-pyridol, 5-pyridol, 5-bromo-2-pyridol, and the like; and alkyl substituted phenols such as p-cresol, m-cresol, 2,6-dimethylphenol, p-ethylphenol, o-ethylphenol, 2,6-diethylphenol, 2,4,6-triethylphenol, 2,4-diisopropylphenol, p-tert-butyl phenol, 2,6-di-tert-butylphenol, 2,4,6-tri-tert-butylphenol 3,5-di-tert-butylphenol, 3,6-diisoamyl phenol, p,n-hexyl, phenol, m,n-hexyl phenol, 2,6-di-n-hexylphenol, and the like.

The second most preferred embodiment of this invention involves the use of mononuclear phenolic compounds characterized by containing from 1 to 2 phenolic hydroxyl groups and from 6 to about 24 carbon atoms. Illustrative of such compounds are, in addition to the mononuclear monohydric phenols listed in the above paragraph, such catechol derivatives as 3-methyl catechol, 4-ethyl catechol, 3,5-diethyl catechol, 3-isopropyl catechol, 3,5-diisopropyl catechol, 3-tert-butyl catechol, 3,5-di-(tert-butyl)catechol, 4-amyl catechol, 4-tert-amyl catechol, 3,5-di(tert-amyl)catechol, and the like; resorcinol and its various derivatives such as 2-methyl resorcinol, 2,4-dimethyl resorcinol, 2,4,6-triisopropyl resorcinol, 2-tert-butyl resorcinol, 2,5-di-(tert-butyl)resorcinol, 2,4,6-tri-(tert-butyl)resorcinol, 2-amyl resorcinol, 2,4-diamyl resorcinol, 2,4,6-tri(tert-amyl)resorcinol, 2,4,6-tri-(tert-hexyl)resorcinol and the like; hydroquinone and its derivatives such as 2-methyl hydroquinone, 2,3-dimethyl hydroquinone, 2,6-diisopropyl hydroquinone, 2,3,5-tri-(tert-butyl)hydroquinone, 3-amyl hydroquinone, 3,5-diamyl hydroquinone, 3,5,6-triamyl hydroquinone, 3,5-dihexyl hydroquinone, and the like. Pyrogallol and its derivatives such as, 4-methyl pyrogallol, 4-ethyl pyrogallol, 4,5-diethyl pyrogallol, 4,5,6-triisopropyl pyrogallol, 4,5,6-tri-(tert-amyl)pyrogallol, 4,5,6-tri-(tert-hexyl)pyrogallol and the like.

The third preferred class of phenols are phenolic compounds characterized by containing in the molecule from 1 to 2 aromatic rings, from 1 to 2 phenolic hydroxyl groups and from about 6 to about 36 carbon atoms. Illustrative of these compounds, in addition to those compounds already named, are such monohydric fused ring compounds as α-naphthol, β-naphthol, 2,3,6-triisopropyl-α-naphthol, 1,5-di-n-amyl-β-naphthol; and such dihydric phenols as 1,5-dihydroxynaphthalene, 2,7-di-tert-butyl-1,5-dihydroxy-naphthalene, 2,3,6-tri-tert-hexyl dihydroxynaphthol, and the like; and such non-fused ring compounds as 2,2'-dihydroxydiphenyl, 2-hydroxydiphenyl, 3-methyl-3'-hydroxy diphenyl, 3-methyl-3'-n-butyl-4,4'-dihydroxy diphenyl, 2-methyl-3'-ethyl-3-hydroxydiphenylmethane, 3,3'-dimethyl-4,4'-dihydroxydiphenyl sulfide, and the like.

The fourth preferred class of phenolic inhibitors are those phenolic compounds characterized by containing in the molecule from one to two aromatic rings, from 1 to 4 phenolic hydroxyl groups, and from 6 to about 36 carbon atoms. Illustrative of compounds of this class, in addition to those compounds already named, are such fused ring compounds as the trihydroxynaphthalenes such as 1,4,5-trihydroxynaphthalene, 2-methyl-1,4,5-trihydroxy-naphthalene, 3-isopropyl-1,4,5-trihydroxynaphthalene, 3,6-diisopropyl-1,4,5-trihydroxynaphthalene, 2,3,6-trihexyl-1,4,5-trihydroxynaphthalene, and the like, tetrahydroxynaphthalenes such as 1,4,5,8-tetrahydroxynaphthalene, 2-methyl-1,4,5,8-tetrahydroxynaphthalene, 2-ethyl-1,4,5,8-tetrahydroxynaphthalene, 3-ethyl-1,4,5,8-tetrahydroxynaphthalene, 2-hexyl-1,4,5,8-tetrahydroxynaphthalene and the like.

Included within this class of compounds also are those non-fused ring compounds characterized by containing from about 1 to 4 hydroxyl groups and having from 6 to about 36 carbon atoms in the molecule. Illustrative of such compounds are 2,2'-dihydroxydiphenyl, 2,2,4'-trihydroxydiphenyl, 2,2',2''-trihydroxy-m-terphenyl, 2,3',3''-trihydroxyterphenyl, and the like.

Having described the invention, what is claimed is:

1. Vinyl chloride monomer containing ½ to 30 parts phenol per million of monomer.
2. Vinyl chloride monomer containing ½ to 10 parts phenol per million of monomer.
3. Vinyl chloride monomer containing ½ to 2 parts phenol per million of monomer.

References Cited by the Examiner
UNITED STATES PATENTS

| | | | |
|---|---|---|---|
| 2,121,010 | 6/1938 | Britton et al. | 260—652.5 |
| 2,136,333 | 11/1938 | Coleman et al. | 260—652.5 |
| 2,181,102 | 11/1939 | Stoesser et al. | 260—652.5 |
| 2,810,765 | 10/1957 | Neuworth et al. | 260—652.5 |
| 2,846,481 | 8/1961 | Roth et al. | 260—652.5 |
| 2,846,482 | 8/1961 | Roth et al. | 260—652.5 |
| 3,017,426 | 1/Ruffing et al. | | 260—652.5 |
| 3,062,900 | 11/1962 | Coover et al. | 260—652.5 |

LEON ZITVER, *Primary Examiner.*

ABRAHAM RIMENS, ALPHONSO D. SULLIVAN,
*Examiners.*